United States Patent
Markies et al.

(10) Patent No.: US 10,208,215 B2
(45) Date of Patent: Feb. 19, 2019

(54) INK COMPOSITION, PINNING AGENT AND PRINT METHOD

(71) Applicant: OCE-TECHNOLOGIES B.V., Venlo (NL)

(72) Inventors: Peter R. Markies, Venlo (NL); Peter O. Colin, Venlo (NL); Jozef P. Moonen, Venlo (NL); Ke Peng, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 237 days.

(21) Appl. No.: 15/216,848

(22) Filed: Jul. 22, 2016

(65) Prior Publication Data

US 2016/0326385 A1    Nov. 10, 2016

Related U.S. Application Data

(63) Continuation of application No. PCT/EP2015/052159, filed on Feb. 3, 2015.

(30) Foreign Application Priority Data

Feb. 6, 2014  (EP) .................................. 14154073
Apr. 30, 2014  (EP) .................................. 14166534

(51) Int. Cl.
*B41J 2/01*    (2006.01)
*C09D 11/107*    (2014.01)
(Continued)

(52) U.S. Cl.
CPC .............. *C09D 11/03* (2013.01); *B41J 2/01* (2013.01); *C08G 65/00* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 3,844,994 A    10/1974 Vijayendran
5,969,002 A    10/1999 Kijlstra et al.
(Continued)

FOREIGN PATENT DOCUMENTS

EP        0 827 973 A1    3/1998
WO    WO 2004/101638 A1    11/2004
WO    WO 2013/167389 A1    11/2013

OTHER PUBLICATIONS

Sigma—Aldrich (Feb. 27, 2015; pp. 1-7) Safety Data Sheet discloses Polypropylene Oxide formula is C3H8O2.*
(Continued)

*Primary Examiner* — Manish S Shah
(74) *Attorney, Agent, or Firm* — Birch, Stewart, Kolasch & Birch, LLP

(57) ABSTRACT

The invention relates to an ink composition, the ink composition including a pinning agent. The pinning agent provides the ink composition with thermogelling behavior. The invention further relates to a pinning agent suitable for an ink composition. The invention further relates to a method for applying an image to a receiving medium using an ink composition including a pinning agent.

10 Claims, 4 Drawing Sheets

(51) Int. Cl.
  *C09D 11/03* (2014.01)
  *C09D 11/102* (2014.01)
  *C09D 11/322* (2014.01)
  *C08G 65/00* (2006.01)
  *C08G 65/333* (2006.01)
  *C08L 71/02* (2006.01)

(52) U.S. Cl.
  CPC . *C08G 65/33348* (2013.01); *C08G 65/33365* (2013.01); *C08L 71/02* (2013.01); *C09D 11/102* (2013.01); *C09D 11/107* (2013.01); *C09D 11/322* (2013.01); *C08G 2650/58* (2013.01)

(58) Field of Classification Search
  CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
  See application file for complete search history.

(56) References Cited

U.S. PATENT DOCUMENTS

| | | |
|---|---|---|
| 8,318,853 B2 | 11/2012 | Howe et al. |
| 2005/0172853 A1 | 8/2005 | Bruchmann et al. |
| 2006/0211815 A1 | 9/2006 | Licht et al. |
| 2007/0128532 A1* | 6/2007 | Grimm ................ C09D 11/322 106/31.8 |
| 2011/0217522 A1* | 9/2011 | Ohmoto ................... B41J 2/015 347/20 |

OTHER PUBLICATIONS

Sigma—Aldrich (Aug. 3, 2015; pp. 1-7) Safety Data Sheet discloses Polyethylene Oxide formula is (C2H4O)nH2O.*
International Search Report (PCT/ISA/210) issued in PCT/EP2015/052159, dated Apr. 9, 2015.
Search Report issued in European Patent Application No. 14154073, dated Apr. 15, 2014.
Written Opinion (PCT/ISA/237) issued in PCT/EP2015/052159, dated Apr. 9, 2015.

* cited by examiner

INK COMPOSITION, PINNING AGENT AND PRINT METHOD

CROSS REFERENCE TO RELATED APPLICATIONS

This application is a Continuation of PCT International Application No. PCT/EP2015/052159, filed on Feb. 3, 2015, which claims priority under 35 U.S.C. 119(a) to patent application Ser. No. 14/154,073.2, filed in Europe on Feb. 6, 2014, and patent application Ser. No. 14/166,534.9, filed in Europe on Apr. 30, 2014, all of which are hereby expressly incorporated by reference into the present application.

The invention relates to an ink composition. The invention further relates to a pinning agent. In addition, the invention relates to a method for manufacturing an ink composition and a pinning agent, respectively. The invention also relates to a printing method.

BACKGROUND OF THE INVENTION

Aqueous inks, i.e. inks comprising an aqueous medium are known in the art. These inks may be applied onto a recording medium, such as paper, by jetting droplets of the ink onto the recording medium. A problem associated with jetting droplets of an aqueous ink onto a recording medium is the so called puddling phenomena: several drops tend to combine to bigger puddles in a non-controllable way. The occurrence of puddling results in visual decrease of the print quality. To prevent puddling, the droplets of ink have to be immobilized on the recording medium shortly after the droplet has been applied onto said medium. There are a number of possibilities to immobilize the droplets, such as precipitating the colorant using a primer, or by pinning the droplet. Pinning of the droplet may be effectuated by a so-called pinning agent. A pinning agent is a component that immobilizes the droplet by increasing its viscosity. In this way, displacement of the droplet is prevented.

A pinning agent may be e.g. a thermogelation additive. A thermogelation additive is a component that can be added to an ink composition and that gels the ink composition at an elevated temperature. An example of such thermogelating pinning agent is known from U.S. Pat. No. 8,318,853. However, there is a need for alternative thermogelating pinning agents for aqueous inks.

Therefore, it is an object of the present invention to provide an alternative pinning agent. It is a further object to provide an ink composition comprising such pinning agent.

SUMMARY OF THE INVENTION

The object of the invention is achieved in an ink composition comprising an aqueous medium, a colorant, a water-dispersed resin and a pinning agent, the pinning agent consisting essentially of a product of a coupling reaction between at least two polyether units and a linker, the linker comprising at least two linking groups, wherein a first one of the at least two polyether units comprises an ethylene oxide moiety ($—[CH_2CH_2O]—$) and wherein the second one of said at least two polyether units comprises ($—[R^1O]—$) moiety, wherein $R^1$ is an alkyl group comprising 3-7 carbon atoms, and wherein each one of the at least two linking groups is capable of reacting with an endgroup of a polyether unit.

Aqueous Medium

The ink composition may comprise an aqueous vehicle, said vehicle comprising water. Water may function as the vehicle in the ink composition and may dissolve and/or disperse the components of the ink, such as the colorant, the dispersible resin and the pinning agent. It may be beneficial to use water as the vehicle in the ink composition for health, safety and environmental reasons. When water evaporates, for example after droplets of the ink have been applied onto the receiving medium, no VOC (volatile organic compounds) may be emitted. Moreover, water vapor may reduce the risk of fire, since water is not flammable, in contrast to many organic solvents.

Optionally, co-solvents may be added to the ink composition. Co-solvents may be added to tune the properties of the ink composition, for example the polarity of the ink, the viscosity of the ink and/or the film formation of the ink on a receiving material may be tuned by adding co-solvents to the ink composition.

Co-solvents may be present in the ink composition in an amount of from 0 wt %-40 wt % with respect to the total ink composition, for example from 2 wt %-32 wt % with respect to the total ink composition. Non-limiting examples of co-solvents are glycol, ethylene glycol, propylene glycol, diethylene glycol, glycerin, 1,2-propanediol, n-pyrrolidone, 1,5-pentanediol, 1,6-hexanediol and 1,2,6-hexanetriol. The co-solvent, as well as the amount of the co-solvent added to the ink composition may preferably be selected such that the pinning agent is soluble in the resulting ink vehicle.

Colorant

The colorant may provide the ink composition with color. The colorant may be a pigment or a dye. The dye may dissolve in the ink composition. Alternatively, the colorant may be a pigment. The pigment may not dissolve in the ink composition. The pigment may be dispersible in the ink composition. Alternatively, a mixture of a dye and a pigment may be used as the colorant.

Water-Dispersed Resin

The ink composition may further comprise a water-dispersed resin. The inkjet ink according to the present invention may contain a water-dispersed resin in view of the colorant fixability to recording media. The water dispersed resin may also be referred to as latex resin. As the water-dispersed resin, a water-dispersed resin excellent in film formability (image formability) and having high water repellency, high waterfastness, and high weatherability is useful in recording images having high waterfastness and high image density (high color developing ability).

Examples of the water-dispersed resin include condensed synthetic resins, addition synthetic resins and natural polymer compounds.

Examples of the synthetic resins include polyester resins, polyurethane resins, polyepoxy resins, polyamide resins, polyether resins, poly(meth)acrylic resins, acryl-silicone resins, fluorine-based resins.

Examples of the addition synthetic resins include polyolefin resins, polystyrene-based resins, polyvinyl alcohol-based resins, polyvinyl ester-based resins, poly(meth)acrylic acid-based resins, styrene-acrylate copolymer resins and unsaturated carboxylic acid-based resins.

Examples of the natural polymer compounds include celluloses, rosins, and natural rubbers.

The water-dispersed resin used in the present invention may be made of a resin having a water soluble functional group such as a carboxylic group or a sulfo group. Examples of the water-dispersed resin are made of at least one of the following group consisting of: a vinyl acetate resin, a styrene-butadiene resin, a vinyl chloride resin, an acrylic-styrene resin, a butadiene resin, a styrene resin, or it may be a mixture of these resins.

Examples of commercially available water-dispersed resin emulsions include: Joncryl 537 and 7640 (styrene-acrylic resin emulsion, made by Johnson Polymer Co., Ltd.), Microgel E-1002 and E-5002 (styrene-acrylic resin emulsion, made by Nippon Paint Co., Ltd.), Voncoat 4001 (acrylic resin emulsion, made by Dainippon Ink and Chemicals Co., Ltd.), Voncoat 5454 (styrene-acrylic resin emulsion, made by Dainippon Ink and Chemicals Co., Ltd.), SAE-1014 (styrene-acrylic resin emulsion, made by Zeon Japan Co., Ltd.), Jurymer ET-410 (acrylic resin emulsion, made by Nihon Junyaku Co., Ltd.), Aron HD-5 and A-104 (acrylic resin emulsion, made by Toa Gosei Co., Ltd.), Saibinol SK-200 (acrylic resin emulsion, made by Saiden Chemical Industry Co., Ltd.), and Zaikthene L (acrylic resin emulsion, made by Sumitomo Seika Chemicals Co., Ltd.), acrylic copolymer emulsions of DSM Neoresins, e.g. the NeoCryl product line, in particular acrylic styrene copolymer emulsions NeoCryl A-662, NeoCryl A-1131, NeoCryl A-2091, NeoCryl A-550, NeoCryl BT-101, NeoCryl SR-270, NeoCryl XK-52, NeoCryl XK-39, NeoCryl A-1044, NeoCryl A-1049, NeoCryl A-1110, NeoCryl A-1120, NeoCryl A-1127, NeoCryl A-2092, NeoCryl A-2099, NeoCryl A-308, NeoCryl A-45, NeoCryl A-615, Neocryl A-633, NeoCryl BT-24, NeoCryl BT-26, NeoCryl BT-26, NeoCryl XK-15, NeoCryl X-151, NeoCryl XK-232, NeoCryl XK-234, NeoCryl XK-237, NeoCryl XK-238- NeoCryl XK-86, NeoCryl XK-90 and NeoCryl XK-95, acrylic copolymer emulsions of Alberdingk Boley GmbH, or styrene-acrylic copolymer emulsions of Alberdingk Boley GmbH. However, the water-dispersed resin emulsion is not limited to these examples.

The water-dispersed resin may be used in the form of a homopolymer, a copolymer or a composite resin, and all of water-dispersed resins having a monophase structure or core-shell structure and those prepared by power-feed emulsion polymerization may be used.

As the water-dispersed resin, it is possible to use a resin itself having a hydrophilic group and self-dispersibility, and a resin itself having no dispersibility but to which the dispersibility is imparted with use of a surfactant and another resin having a hydrophilic group. Among these resins, an emulsion of a resin fine particle obtained by emulsification or suspension polymerization of ionomer of a polyester resin or polyurethane resin is most suitably used. In the case of emulsification of an unsaturated monomer, a resin emulsion is obtained by reacting water into which the unsaturated monomer, a polymerization initiator, a surfactant, a chain transfer agent, a chelating agent and a pH adjustor are added. Thus, a water-dispersed resin can be easily obtained, and desired properties are easily obtained because the resin components can be changed.

As the unsaturated monomer, unsaturated carboxylic acids, monofunctional or polyfunctional (meth)acrylic acid ester monomers, (meth)acrylic acid amide monomers, aromatic vinyl monomers, vinyl cyano compound monomers, vinyl monomers, allyl compound monomers, olefin monomers, diene monomers, and oligomers having unsaturated carbons may be used alone or in combination. By combining these monomers, properties or the resulting resin can be flexibly modified. The properties of the resulting resin can also be modified with use of an oligomer type polymerization initiator, through a polymerization reaction or graft reaction.

Examples of the unsaturated carboxylic acids include acrylic acids, methacrylic acid, itaconic acids, fumaric acids, and maleic acids.

Examples of the monofunctional (meth)acrylic acid ester monomers include methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethylaminoethyl methacrylate, methacryloxyethyltrimethyl ammonium salt, 3-methacryloxypropyl trimethoxysilane, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethylaminoethyl acrylate, and acryloxyethyltrimethoxy ammonium salt.

Examples of the polyfunctional (meth)acrylic acid monomers include ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl)propane, tri methylolpropane trimethacrylate, trimethylolethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, 2,2'-bis(4-acryloxydiethoxyphenyl)propane, tri methylolpropane triacrylate, trimethylolethane triacrylate, tetramethylolmethane triacrylate, ditrimethylol tetraacrylate, tetramethylolmethane tetraacrylate, pentaerythritol tetraacrylate, and dipentaerythritol hexaacrylate.

Examples of the (meth)acrylic acid amide monomers include acrylamide, methacrylamide, N,N-dimethyacrylamide, methylene-bis-acrylamide, and 2-acrylamide-2-methylpropane sulfonic acid. Examples of the aromatic vinyl monomers include styrene, methylstyrene, vinyltoluene, 4-t-butylstyrene, chlorostyrene, vinylanisole, vinylnaphthalene, and divinylbenzene.

Examples of the vinyl cyano compound monomers include acrylonitrile, and methacrylonitrile.

Examples of the vinyl monomers include vinyl acetate, vinylidene chloride, vinyl ether, vinyl ketone, vinylpyrrolidone, vinyl sulfonic acid or salts thereof, vinyltrimethoxysilane, and vinyltriethoxysilane.

Examples of the allyl compound monomers include allylsulfonic acid or salts thereof, allylamine, ally chloride, diallylamine, and diallyldimethylammonium salts.

Examples of the olefin monomers include ethylene, and propylene. Examples of the diene monomers include butadiene, and chloroprene.

Examples of the oligomers having unsaturated carbon atoms include styrene oligomers having methacryloyl groups, styrene-acrylonitrile oligomer having methacryloyl groups, methyl methacrylate oligomers having methacryloyl groups, dimethyl siloxane oligomers having methacryloyl groups, and polyester oligomers having acryloyl groups.

The content of the water-dispersed resin added in the ink composition of the present invention may be from 1-40 weight % based on the total weight of the ink, and it may be preferably from 1.5-30 weight %, and it may be more preferably from 2-25 weight %. Even more preferably, the amount of the water-dispersed resin contained in the inkjet ink, as a solid content, may be 2.5 weight % to 15 weight %, and even more preferably 3 weight % to 7 weight %, relative to the total ink composition. Note that the solid content of the inkjet ink can be determined by a method of separating only water dispersed components of the ink composition, such as the water-dispersed resin parts and water-dispersed colorant parts, from the inkjet ink. In addition, when a pigment is used as a water-dispersed colorant, a mass reduction ratio of the resulting inkjet ink is evaluated through a thermal mass analysis, thereby making it possible to measure a mass ratio between the colorant parts and the water-dispersed resin parts. In the case where the colorant is an inorganic pigment contained in heavy metal atoms and molecular skeleton, or a metal-containing organic pigment or metal-containing dye, the solid content parts of the colorant can be determined by the fluorescent X-ray analysis or by TGA.

The average particle diameter (D50) of the water-dispersed resin may be preferably from 10 nm-1 µm, it may be more preferably from 2-500 nm, and it may be still more preferably from 10-200 nm, and especially preferably it may be from 20-200 nm.

When the average particle diameter (D50) is less than 2 nm, significant effects in improving the image quality or enhancing transfer characteristics of the image cannot be fully expected, even if aggregation occurs.

The average particle diameter (D50) of the water-dispersed resin may be relevant to the viscosity of the dispersion liquid. In the case of water-dispersed resins having the same composition, the smaller the particle diameter, the higher may be the viscosity at the same solid content.

When the average particle diameter (D50) is greater than 1 µm, there may be a possibility that the ejection characteristics of the ink from the inkjet head or the storage stability of the ink will be deteriorated. In order not to impair the ink ejection stability, the average particle diameter (D50) of the water-dispersed resin may be preferably 200 nm or smaller, and more preferably 150 nm or smaller.

In addition, there are no specific restrictions to the particle size distribution of the polymer particles, and it is possible that the polymer particles have a broad particle size distribution or the polymer particles have a particle size distribution of mono-disperse type.

In an embodiment, two or more water-dispersed resins may be used in combination in the ink.

Pinning Agent

The pinning agent may provide the ink with thermogelling behavior. The pinning agent may undergo a structural change under influence of temperature, such that at lower temperatures the viscosity of the ink is relatively low and at higher temperatures, the viscosity of the ink is relatively high. The temperature or temperature range at which the change in viscosity occurs may depend on the concentration of the pinning agent, the chemical properties of the pinning agent and also on the presence of other components in the ink composition.

The low viscosity of a (ink) composition comprising a pinning agent at low temperatures allows to jet droplets of the ink at low temperatures, for example using a print head. By increasing the temperature of the jetted ink droplets, the viscosity of the droplets increases and the droplets may immobilize.

The viscosity increase may be caused by the formation of a network by the pinning agent. Alternatively, the viscosity increase may be caused by the formation of micelles. The pinning agent may be a water soluble component. The pinning agent is preferably soluble in the ink vehicle. The ink vehicle may comprise water and may further comprise one or more co-solvents.

The pinning agent may comprise a plurality of polyether units. The polyether units may be coupled by a suitable linker. The polyether units may comprise an endgroup. Preferably, the polyether units may comprise a plurality of endgroups. The linker may comprise a plurality of linking groups. By reacting the endgroups of the polyether unit and the linking groups of the linker, a chemical bond may be formed between the polyether unit and the linking group. Preferably, a plurality of polyether units is coupled to a linker. The endgroup of the polyether and the linking group of the linker should be selected such that a chemical bond may be formed upon reacting the linker and the polyether. For example, the polyether unit may comprise hydroxyl endgroups. The linker may comprise an isocyanate linking group, an acid chloride linking group or a carboxylic acid linking group. Reaction may result in the formation of a urethane linkage or ester linkage, respectively. In an alternative example, the linker may be cyanuric chloride. In that case, reaction between the linker and a polyether unit may result in the formation of an ether linkage. The polyether unit may be modified and may comprise end groups different from hydroxyl endgroups, for example an amine endgroup, e.g. an —$NH_2$ endgroup. Reaction between such polyether unit and a linker having an isocyanate linking group, an acid chloride linking group or a carboxylic acid linking group may result in the formation of an amide linkage. The linker may not be a ether unit or a polyether unit.

The polyether units may be branched or linear. The linker may comprise two or more linking groups, for example three linking groups. By reacting linear polyethers with a linker comprising two linking groups, a linear pinning agent may be obtained. By reacting a polyether with a linker, wherein the polyether is branched and/or the linker has three or more linking groups, a branched pinning agent may be obtained. Such components (branched and/or linear) are suitable to be used as pinning agents in an ink composition, preferably an ink composition comprising a water-dispersed resin. A pinning agent having a branched structure may show even improved pinning behavior, compared to pinning agents having a linear structure.

The pinning agent may comprise at least two polyether units that are linked. A first one of the at least two polyether units may comprise an ethyleneoxide moiety (—[$CH_2CH_2O$]—). The first one of the at least two polyether units may be a polymer consisting of ethyleneoxide moieties, which is also known as a polyethyleneglycol (PEG) polymer. Alternatively, the first one of the at least two polyether units may be a copolymer comprising ethyleneoxide moieties and other alkyleneoxide moieties. Examples of alkyleneoxide moieties are propyleneoxide moieties and butyleneoxide moieties.

A second one of said at least two polyether units may comprise a —[$R^1O$]— moiety, wherein $R^1$ is an alkyl group comprising 3-7 carbon atoms. Hence, the —[$R^1O$]— moiety may be e.g. a —[$CH(CH_3)CH_2O$]— moiety, a —[$CH_2CH(CH_3)O$]— moiety, a —[$CH_2CH_2CH_2O$]— moiety, a —[$CH_2CH_2CH_2CH_2O$]— moiety, a —[$CH_2(CH_2)_3CH_2O$]— moiety, a [$CH(C_2H_5)CH_2O$]— moiety, a —[$CH(C_3H_7)CH_2O$]— moiety or a —[$CH(C_4H_9)CH_2O$]— moiety. The propyl and butyl groups may be branched or linear. The second one of the at least two polyether units may be a polypropyleneoxide polymer. Alternatively, the second one of the at least two polyether units may be a copolymer comprising more than one type of alkyleneoxide moiety. In a further alternative, the second one of the at least two polyether units may consist of a polytetrahydrofuran polymer.

The pinning agent may be obtained for example by reacting polyethyleneoxide and polypropyleneoxide with a suitable linker, for example a isocyanate linker, such as a diisocyanate, a triisocyanate or a tetraisocyanate. By reacting polyethyleneoxide and polypropyleneoxide with a suitable linker, a pinning agent may be formed that comprises both polyethyleneoxide and polypropylene oxides. Pinning agents comprising both polyethyleneoxide and polypropylene oxides may show suitable pinning behavior.

In case an ink composition comprises a water-dispersed resin in addition to the pinning agent, the viscosity increase due to the pinning behavior of the pinning agent may be further increases by the resin particles present. Thus, there may be a synergistic effect between the pinning agent and the water-dispersed resin present in the ink composition.

In an embodiment, the at least two polyether units are polyethyleneoxide/polypropyleneoxide block copolymers. In this embodiment, the first and the second one of the at least two polyether units comprise ethyleneoxide moieties and propyleneoxide moieties. For example, the pinning agent may comprise polyethyleneoxide-polypropyleneoxide-polyethyleneoxide triblock copolymer units.

Without wanting to be bound to any theory, it is believed that the ethyleneoxide/propyleneoxide block copolymer units may form micelles above a critical micellization temperature. As a consequence, the viscosity of a solution, such as an ink, comprising a pinning agent in accordance with the present invention, may increase above the critical micellization temperature of the pinning agent. Ethyleneoxide/propyleneoxide block copolymer may be synthesized by methods known in the art. A number of ethyleneoxide/propyleneoxide block copolymers are commercially available, for example the Pluronic® copolymers. Several different copolymers are available within the Pluronic® series. Also Tetronics® may be advantageously used.

In an embodiment, the pinning agent may consist essentially of a product of a coupling reaction between a diisocyanate and an ethyleneoxide/propyleneoxide block copolymer. The pinning agent may consist essentially of a product of a coupling reaction between a diisocyanate and a polyethyleneoxide-polypropyleneoxide-polyethyleneoxide triblock copolymer. The ethyleneoxide/propyleneoxide block copolymers, such as the polyethyleneoxide-polypropyleneoxide-polyethyleneoxide triblock copolymers may comprise a hydroxyl (—OH) functional group as an end group. In the coupling reaction, the OH endgroup and the isocyanate group can react, thereby forming a urethane linkage. The diisocyanate comprises two isocyanate functional groups. Hence, a diisocyanate may react with two OH functional groups, such as OH endgroups of ethyleneoxide/propyleneoxide block copolymers. In addition, an ethyleneoxide/propyleneoxide block copolymer may comprise two hydroxyl endgroups. Therefore, by reacting a diisocyanate and an ethyleneoxide/propyleneoxide block copolymer, a plurality of ethyleneoxide/propyleneoxide block copolymer units may be linked together. In this way, a component comprising a plurality of ethyleneoxide/propyleneoxide block copolymer units and having an enlarged molecular weight may be formed. The component may function as a pinning agent in an ink composition.

The block copolymer units can be linked using a diisocyanate. Preferably, cyclic diisocyanates are used. Not limiting examples of diisocyanates are toluene diisocyanate, methylene diphenyl diisocyanate, trimethyl hexamethylenediisocyanate, hexamethylene diisocyanate, 1,3-phenylene diisocyanate, 1,4-phenylene diisocyanate, 1,3-bis(isocyanatomethyl)benzene, 4-methyl-1,3-phenylene diisocyanate, 2-methyl-m-phenylene diisocyanate, trans-1,4-cyclohexylene diisocyanate, 4,4'-methylenebis(phenyl isocyanate), 1,3-bis(1-isocyanato-1-methylethyl)benzene and isophorone diisocyanate.

The structure of the diisocyanate linker may influence the properties of the pinning agent. For example, the structure of the pinning agent may influence the pinning temperature as well as the viscosities above and below the pinning temperature.

The pinning agent is preferably non-crystalline. Using a non-symmetrical diisocyanate linker may decrease the crystallinity of the pinning agent. Preferably, the isocyanate linking groups are sterically shielded.

In an alternative embodiment, the pinning agent may consist essentially of a product of a coupling reaction between cyanuric chloride and an ethyleneoxide/propyleneoxide block copolymer. Cyanuric chloride has three chloride atoms that may react with the hydroxyl endgroups of an ethyleneoxide/propyleneoxide block copolymer. Reaction between cyanuric chloride and the ethyleneoxide/propyleneoxide block copolymer may result in the formation of an ether linkage between the cyanuric chloride and a polyether moiety. Ether linkages are stable chemical bonds and are resistant to hydrolysis. Hence, pinning agent made using cyanuric chloride may be stable and may not degrade easily, not even in aqueous inks at elevated temperatures. Cyanuric chloride comprises three chloride atoms that are capable of reacting with hydroxyl endgroups. Hence, three linkages can be formed between the cyanuric chloride linker and ethyleneoxide/propyleneoxide polyether units, thereby forming a pinning agent having a branched structure. Pinning agents having a branched structure may show even improved viscosity increasing effect upon increasing temperature, compared to pinning agents having a linear structure.

The content of the pinning agent in the ink composition of the present invention may be from 0.2-25 weight % based on the total weight of the ink, and it may be preferably from 0.5-15 weight %, and it may be more preferably from 1-10 weight %. The amount of pinning agent may be suitably selected. The amount may be selected such, that the ink effectively pins at higher temperatures. Further, the amount of pinning agent may be selected such that the viscosity of the ink composition at a jetting temperature is sufficiently low to allow efficient ejection of droplets through a nozzle of an inkjet print head.

The ink composition may further comprise additional components. For example, the ink composition may comprise a surface tension modifying agent. The surface tension modifying agent may be any compound that has surface active properties and does not react with other components of the latex composition.

Examples of suitable surface tension modifying agents are surfactants like the Triton X series (Triton X-100), which are octylphenolethoxylate surfactants; aerosol OT (dioctyl sodium sulphosuccinate), SDS (sodium dodecyl sulphate) and polysiloxane based surfactants (e.g. Byk 349).

The ink composition may further comprise a buffer to maintain the pH of the ink composition within a predetermined range, a fungicide, a biocide, and an anti-oxidant.

In an embodiment, the ink comprises a radiation curable component. The radiation curable component may be soluble or dispersible in the aqueous medium of the ink.

Radiation curable components are components that may undergo a polymerization reaction upon applying energy to the components. For example, the curable components may polymerize upon irradiation with a suitable type of radiation, such as UV radiation. Alternatively or additionally, the curable components may polymerize upon applying heat to the components. Radiation curable components that are soluble or dispersible in an aqueous medium are known in the art. The skilled person will be able to select an appropriate radiation curable component, e.g. based on the nature of the other components of the ink and the envisaged use of the ink.

In an embodiment, the colorant is a dispersed pigment. Examples of the pigment usable in the present invention include those commonly known without any limitation. Examples of the pigments are not particularly limited, but preferred are an azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, or diketopyrrolopyrrole dye.

For example, inorganic pigments and organic pigments for black and color inks are exemplified. These pigments may be used alone or in combination. As the inorganic pigments, it is possible to use carbon blacks produced by a known method such as a contact method, furnace method and thermal method, in addition to titanium oxide, iron oxide, calcium carbonate, barium sulfate, aluminum hydroxide, barium yellow, cadmium red and chrome yellow.

As the organic pigments, it is possible to use azo pigments (including azo lake, insoluble azo pigments, condensed pigments, chelate azo pigments and the like), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., basic dye type chelates, and acidic dye type chelates), nitro pigments, nitroso pigments, aniline black. Among these, particularly, pigments having high affinity with water are preferably used.

Specific pigments which are preferably usable are listed below.

Examples of pigments for magenta or red include: C.I. Pigment Red 1, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 17, C.I. Pigment Red 22, C.I. Pigment Red 23, C.I. Pigment Red 31, C.I. Pigment Red 38, C.I. Pigment Red 48:1, C.I. Pigment Red 48:2 (Permanent Red 2B(Ca)), C.I. Pigment Red 48:3, C.I. Pigment Red 48:4, C.I. Pigment Red 49:1, C.I. Pigment Red 52:2; C.I. Pigment Red 53:1, C.I. Pigment Red 57:1 (Brilliant Carmine 6B), C.I. Pigment Red 60:1, C.I. Pigment Red 63:1, C.I. Pigment Red 64:1, C.I. Pigment Red 81. C.I. Pigment Red 83, C.I. Pigment Red 88, C.I. Pigment Red 101 (colcothar), C.I. Pigment Red 104, C.I. Pigment Red 106, C.I. Pigment Red 108 (Cadmium Red), C.I. Pigment Red 112, C.I. Pigment Red 114, C.I. Pigment Red 122 (Quinacridone Magenta), C.I. Pigment Red 123, C.I. Pigment Red 139, C.I. Pigment Red 44, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 185, C.I. Pigment Red 190, C.I. Pigment Red 193, C.I. Pigment Red 209, C.I. Pigment Red 219 and C.I. Pigment Red 222, C.I. Pigment Violet 1 (Rhodamine Lake), C.I. Pigment Violet 3, C.I. Pigment Violet 5:1, C.I. Pigment Violet 16, C.I. Pigment Violet 19, C.I. Pigment Violet 23 and C.I. Pigment Violet 38.

Examples of pigments for orange or yellow include: C.I. Pigment Yellow 1, C.I. Pigment Yellow 3, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 24, C.I. Pigment Yellow 34, C.I. Pigment Yellow 35, C.I. Pigment Yellow 37, C.I. Pigment Yellow 42 (yellow iron oxides), C.I. Pigment Yellow 53, C.I. Pigment Yellow 55, C.I. Pigment Yellow 74, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 408, C.I. Pigment Yellow 109, C.I. Pigment Yellow 110, C.I. Pigment Yellow 117, C.I. Pigment Yellow 120, C.I. Pigment Yellow 128, C.I. Pigment Yellow 138, C.I. Pigment Yellow 150, C.I. Pigment Yellow 151, C.I. Pigment Yellow 153 and C.I. Pigment Yellow 183; C.I. Pigment Orange 5, C.I. Pigment Orange 13, C.I. Pigment Orange 16, C.I. Pigment Orange 17, C.I. Pigment Orange 31, C.I. Pigment Orange 34, C.I. Pigment Orange 36, C.I. Pigment Orange 43, and C.I. Pigment Orange 51.

Examples of pigments for green or cyan include: C.I. Pigment Blue 1, C.I. Pigment Blue 2, C.I. Pigment Blue 15, C.I. Pigment Blue 15:1, C.I. Pigment Blue 15:2, C.I. Pigment Blue 15:3 (Phthalocyanine Blue), C.I. Pigment Blue 16, C.I. Pigment Blue 17:1, C.I. Pigment Blue 56, C.I. Pigment Blue 60, C.I. Pigment Blue 63, C.I. Pigment Green 1, C.I. Pigment Green 4, C.I. Pigment Green 7, C.I. Pigment Green 8, C.I. Pigment Green 10, C.I. Pigment Green 17, C.I. Pigment Green 18 and C.I. Pigment Green 36.

In addition to the above pigments, when red, green, blue or intermediate colors are required, it is preferable that the following pigments are employed individually or in combination thereof. Examples of employable pigments include: C.I. Pigment Red 209, 224, 177, and 194, C.I. Pigment Orange 43, C.I. Vat Violet 3, C.I. Pigment Violet 19, 23, and 37, C.I. Pigment Green 36, and 7, C.I. Pigment Blue 15:6.

Further, examples of pigments for black include: C.I. Pigment Black 1, C.I. Pigment Black 6, C.I. Pigment Black 7 and C.I. Pigment Black 11. Specific examples of pigments for black color ink usable in the present invention include carbon blacks (e.g., furnace black, lamp black, acetylene black, and channel black); (CI Pigment Black 7) or metal-based pigments (e.g., copper, iron (CI Pigment Black 11), and titanium oxide; and organic pigments (e.g., aniline black (CI Pigment Black 1).

The pigment may be a self dispersible pigment or not. The self dispersible pigment may show water-dispersibility in water in the absence of an additional dispersant. Self dispersibility may be provided to a pigment, e.g. by the presence of at least one hydrophilic group on the surface of the pigment.

Alternatively, the pigment may not be self dispersible. In that case, the pigment may be provided with dispersibility by coating the pigment with a dispersible polymer. For example, the pigment may be coated with an anionic polymer, a cationic polymer or a zwitterionic polymer. Alternatively, or in addition, the pigment may be coated with a polymer comprising acidic or basic groups. In the latter case, the dispersibility may depend on the pH of the ink and may be suitably tuned by tuning the pH of the medium. The dependency of the dispersibility of the pigment in the ink composition may be used e.g. to precipitate the pigment from the ink composition onto the receiving medium after printing, to pin the pigment onto the receiving medium. This may improve the print quality. The pH may be tuned e.g. by tuning the pH of the receiving medium, or by applying a primer solution onto the receiving medium.

In an aspect of the invention, a method for preparing an ink composition in accordance with the present is provided, the method comprising the steps of:
 providing water;
 providing a pinning agent;
 providing a colorant;
 providing a water-dispersed resin;
 mixing the water, the pinning agent and the colorant.

The pinning agent, the colorant, the water-dispersed resin and water have to be provided. Optionally, an additional solvent may be provided. Preferably, the additional solvent is mixable with water. The pinning agent and the colorant may be provided neat or they may be provided in a solution or dispersion. In case the colorant is a pigment, the pigment is preferably provided as a dispersion, such as an aqueous pigment dispersion. The components may be provided at once, or the components may be added subsequently. The components may be added in any suitable order. In case a dispersable component is added (pigment and/or latex particles), such dispersible component may be preferably added after the other components of the ink composition are provided. Mixing of the components may be carried out at any suitable temperature, for example room temperature.

The ink composition according to the present invention or the ink composition as obtained by a process according to the present invention may be used in an ink, in particular for use in an ink jet process. The present invention therefore also relates to an inkjet ink comprising a pinning agent according to any embodiment of the present invention or as obtained with a process according to any embodiment of the present invention.

In a further aspect of the invention, a method for manufacturing a pinning agent is provided, the method comprising the steps of:
 a. providing a linker comprising at least two linking groups;
 b. providing at least two polyether units, wherein a first one of the at least two polyether units comprises an ethylene oxide moiety ($-[CH_2CH_2O]-$) and wherein the second one of said at least two polyether units comprises an $-[R^1O]-$ moiety, wherein $R^1$ is an alkyl group comprising 3-7 carbon atoms;
 c. reacting the linker and the at least two polyether units, thereby forming a product of a coupling reaction between the linker and the at least two polyether units.

A linker comprising at least two linking groups may be provided. The linker may be e.g. a diisocyanate, such as a cyclic diisocyanate, a dicarboxylic acid or cyanuric chloride. A polyether units may be provided, for example a polyethyleneoxide-polypropyleneoxide-polyethyleneoxide triblock copolymer. The block copolymer may be dried before it reacts with the linker, since some linkers, such as diisocyanates and cyanuric chloride, may react with traces of water, thereby forming unwanted side-products. The linker and the polyether units may be reacted by bringing the components into contact with one another, for example in a solution comprising a solvent. The solution and the solvent are preferably dry. The reaction may be carried out at elevated temperature, such as in between 35° C. to 170° C.

A linkage may be formed by reacting the linker and the polyether units. The reaction may result in the formation of a pinning agent in accordance with the present invention.

The pinning agent in accordance with the present invention may be obtainable by the above described method.

In an embodiment, the linker may comprise at least three linking groups.

In a further embodiment, the linker may be cyanuric chloride and the at least two polyether units may be an ethyleneoxide/propyleneoxide block copolymer.

In an aspect of the invention, a method for applying an image onto a recording medium is provided, the method comprising the steps of:
 a. providing an ink composition, the ink composition comprising an aqueous vehicle, a colorant, a water-dispersed resin and a pinning agent, the pinning agent consisting essentially of a product of a coupling reaction between at least two polyether units and a linker, the linker comprising at least two linking groups, wherein a first one of the at least two polyether units comprises an ethylene oxide moiety ($-[CH_2CH_2O]-$) and wherein the second one of said at least two polyether units comprises ($-[R^1O]-$) moiety, wherein $R^1$ is an alkyl group comprising 3-7 carbon atoms, and wherein each one of the at least two linking groups is capable of reacting with an endgroup of a polyether unit;
 b. keeping the ink composition at a temperature T1, T1 being a temperature below a pinning temperature;
 c. jetting droplets of the ink composition onto a recording medium, the recording medium having a temperature T2, T2 being a temperature above the pinning temperature.

The ink composition according to the present invention may be a thermogelling ink. The thermogelling ink may be fluid at a low temperature. In the context of the present invention, the fluid ink may be an ink that can be jetted using an inkjet print head. The fluid may have a first viscosity. The first viscosity may be a low viscosity. Because of the low viscosity, the fluid may be jetted using a print head. Preferably, in the fluid state, the viscosity of the ink may be in the range of 2 mPa s to 20 mPa·s.

The thermogelling ink may have a second viscosity at a high temperature, the second viscosity being higher than the first viscosity. At high temperature, the viscosity of the ink may be too high to be able to jet droplets of the ink using a print head. The viscosity increase may be caused e.g. by gelling of (components) of the ink or by the formations of micelles in the ink composition. The ink composition may have a pinning temperature. The pinning temperature may be the lowest temperature at which the viscosity of the ink is such that a droplet of ink on a surface of a receiving medium is immobilized.

In step b), the ink composition is kept at a temperature T1, wherein temperature T1 a is a temperature below the pinning temperature. Hence, the ink composition is kept at a temperature at which the ink composition is fluid. For example, the ink composition may be kept at a temperature T1 in a print head. The ink may be jetted using the print head. The temperature T1 may be in the range of 2° C.-30° C., such as from 5° C.-25° C., for example from 8° C.-20° C.

In step c), droplets of the ink composition are jetted onto a recording medium. The recording medium has a temperature T2, which is a temperature above the pinning temperature. By jetting droplets onto the recording medium having a temperature T2—which may be a higher temperature than the temperature of the ejected droplets—the temperature of the droplets increases. The temperature of the droplets may increase to a temperature above the pinning temperature and consequently, the viscosity of the ink may increase, thereby limiting the flowability of the ink droplets and hence, the droplets of the ink become immobilized on the surface of the recording medium. Because of the pinning of the ink, no or only little artifacts, such as puddling or coalescence of the ink may take place, which may result in improved print results. In addition, the elevated temperature of the ink may increase the rate of evaporation of volatile components, such as solvents. This may speed up the drying of the ink. Drying of the ink may even further immobilize the ink on the surface of the recording medium. The temperature T2 may be in the range of 30° C.-65° C., such as from 33° C.-55° C., for example from 35° C.-45° C.

Preferably, the temperature of the medium may be 2 to 50 degrees C. higher than the pinning temperature of the ink composition. If the difference between temperature T2 of the recording medium and the gelling temperature is less than 2° C., then it may take too long to warm the ink composition to a temperature above the gelling temperature and consequently, it may take too long for the viscosity of the ink to increase. When viscosity increase (pinning) takes too long, unwanted coalescence may take place and print artifacts such as inter-color bleeding may occur. Additionally, droplets or lines of droplets may start migrating over the surface of the receiving medium. On the other hand, if the difference between temperature T2 of the recording medium and the gelling temperature is more than 50° C., then gelling of the ink may occur too fast. When the droplets of ink gel too fast, then spreading of the drop on the receiving medium may be insufficient. Moreover, the temperature T2 of the recording medium is preferably lower than the boiling point of a component of the ink. If the temperature T2 of the recording medium is higher than the boiling point of a component in the ink, then the ink may start to boil when it is applied onto the recording medium. This may decrease the print quality.

BRIEF DESCRIPTION OF THE DRAWINGS

The present invention will become more fully understood from the detailed description given herein below and accompanying schematic drawings which are given by way of illustration only and are not limitative of the invention, and wherein.

DETAILED DESCRIPTION OF THE DRAWINGS

Figure 1:
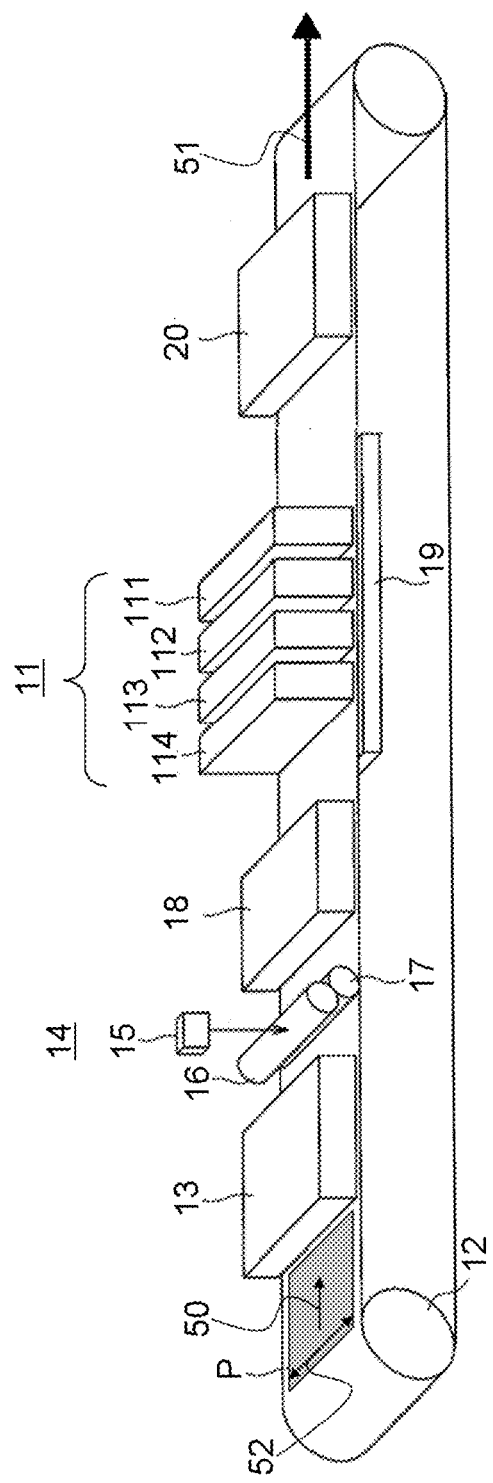
FIG. 1 shows a schematic representation of an inkjet printing system.

In the drawings, same reference numerals refer to same elements.

A printing process in which the inks according to the present invention may be suitably used is described with reference to the appended drawings shown in FIG. 1 and FIG. 2A-C. FIGS. 1 and 2A-C show schematic representations of an inkjet printing system and an inkjet marking device, respectively.

FIG. 1 shows that a sheet of a receiving medium P. The image receiving medium P may be composed of e.g. paper, cardboard, label stock, coated paper, plastic, machine coated paper or textile. Alternatively, the receiving medium may be a medium in web form (not shown). The medium, P, is transported in a direction for conveyance as indicated by arrows 50 and 51 and with the aid of transportation mechanism 12. Transportation mechanism 12 may be a driven belt system comprising one (as shown in FIG. 1) or more belts. Alternatively, one or more of these belts may be exchanged for one or more drums. A transportation mechanism may be suitably configured depending on the requirements (e.g. sheet registration accuracy) of the sheet transportation in each step of the printing process and may hence comprise one or more driven belts and/or one or more drums. For a proper conveyance of the sheets of receiving medium, the sheets need to be fixed to the transportation mechanism. The way of fixation is not particularly limited and may be selected from electrostatic fixation, mechanical fixation (e.g. clamping) and vacuum fixation. Of these, vacuum fixation is preferred.

The printing process as described below comprises of the following steps: media pre-treatment, image formation, drying and fixing and optionally post treatment.

FIG. 1 shows that the sheet of receiving medium P may be conveyed to and passed through a first pre-treatment module 13, which module may comprise a preheater, for example a radiation heater, a corona/plasma treatment unit, a gaseous acid treatment unit or a combination of any of the above.

Any suitable type of heater may be used as a preheater. By using a preheater, the temperature of the receiving medium P may be adjusted to a desired temperature. Preferably, the temperature of the receiving medium may be higher that the temperature of the ink in the inkjet marking device 111, 112, 113, 114. When the sheet of receiving medium P has a temperature higher than the temperature of the ink in the inkjet marking device 111, 112, 113, 114, then the temperature of the ink may increase when it is applied onto the sheet of receiving medium P. When using an ink according to the present invention, the increase in temperature may result in pinning of the respective droplets of ink, thereby preventing print artifacts, such as color bleeding. In addition, increasing the temperature of the sheet of receiving medium may increase the rate of evaporation of solvents, such as water, that may be present in the ink composition.

Image Formation

Image formation is performed in such a manner that, employing an inkjet printer loaded with inkjet inks, ink droplets are ejected from the inkjet heads based on the digital signals onto a print medium. The inkjet inks may be ink jet inks according to the present invention.

Although both single pass inkjet printing and multi pass (i.e. scanning) inkjet printing may be used for image formation, single pass inkjet printing is preferably used since it is effective to perform high-speed printing. Single pass inkjet printing is an inkjet recording method with which ink droplets are deposited onto the receiving medium to form all pixels of the image by a single passage of a receiving medium underneath an inkjet marking module.

In FIG. 1, 11 represents an inkjet marking module comprising four inkjet marking devices, indicated with 111, 112, 113 and 114, each arranged to eject an ink of a different color (e.g. Cyan, Magenta, Yellow and blacK). The nozzle pitch of each head is e.g. about 360 dpi. In the present invention, "dpi" indicates a dot number per 2.54 cm.

An inkjet marking device for use in single pass inkjet printing, 111, 112, 113, 114, has a length, L, of at least the width of the desired printing range, indicated with double arrow 52, the printing range being perpendicular to the media transport direction, indicated with arrows 50 and 51.

Figure 2A:
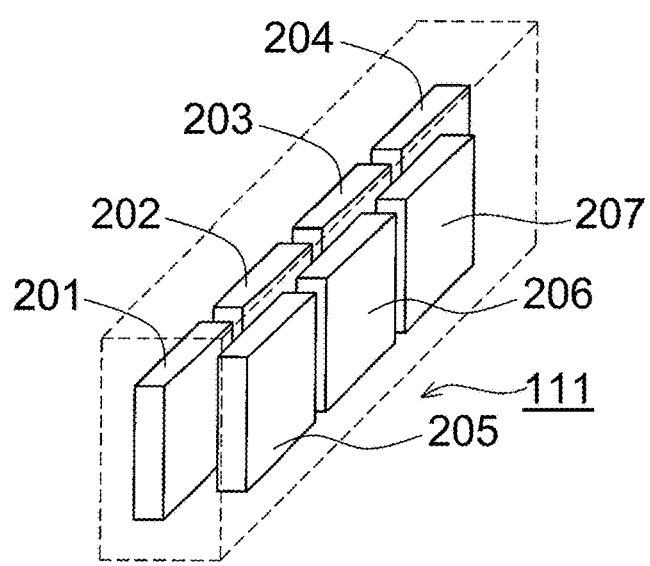
FIG. 2 shows a schematic representation of an inkjet marking device: A) and B) assembly of inkjet heads; C) detailed view of a part of the assembly of inkjet heads.
Figure 2B:
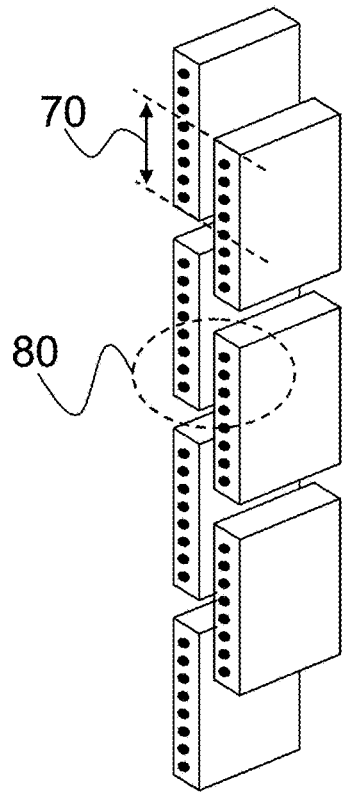
Figure 2C:
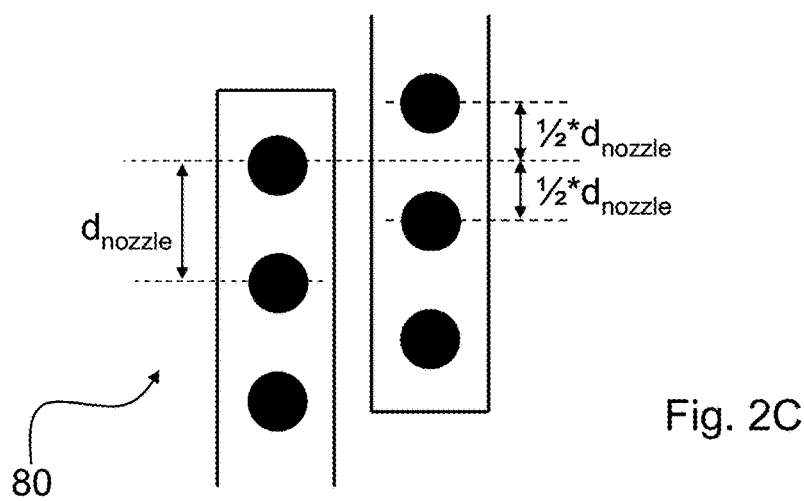

The inkjet marking device may comprise a single print head having a length of at least the width of said desired printing range. The inkjet marking device may also be constructed by combining two or more inkjet heads, such that the combined lengths of the individual inkjet heads cover the entire width of the printing range. Such a constructed inkjet marking device is also termed a page wide array (PWA) of print heads. FIG. 2A shows an inkjet marking device 111 (112, 113, 114 may be identical) comprising 7 individual inkjet heads (201, 202, 203, 204, 205, 206, 207) which are arranged in two parallel rows, a first row comprising four inkjet heads (201-204) and a second row comprising three inkjet heads (205-207) which are arranged in a staggered configuration with respect to the inkjet heads of the first row. The staggered arrangement provides a page wide array of nozzles which are substantially equidistant in the length direction of the inkjet marking device. The staggered configuration may also provide a redundancy of nozzles in the area where the inkjet heads of the first row and the second row overlap, see 70 in FIG. 2B. Staggering may further be used to decrease the nozzle pitch (hence increasing the print resolution) in the length direction of the inkjet marking device, e.g. by arranging the second row of inkjet heads such that the positions of the nozzles of the inkjet heads of the second row are shifted in the length direction of the inkjet marking device by half the nozzle pitch, the nozzle pitch being the distance between adjacent nozzles in an inkjet head, $d_{nozzle}$ (see FIG. 2C, which represents a detailed view of 80 in FIG. 2B). The resolution may be further increased by using more rows of inkjet heads, each of which are arranged such that the positions of the nozzles of each row are shifted in the length direction with respect to the positions of the nozzles of all other rows.

In image formation by ejecting an ink, an inkjet head (i.e. print head) employed may be either an on-demand type or a continuous type inkjet head. As an ink ejection system, there may be usable either the electric-mechanical conversion system (e.g., a single-cavity type, a double-cavity type, a bender type, a piston type, a shear mode type, or a shared wall type), or an electric-thermal conversion system (e.g., a thermal inkjet type, or a Bubble Jet type (registered trade name)). Among them, it is preferable to use a piezo type inkjet recording head which has nozzles of a diameter of 30 μm or less in the current image forming method.

The inkjet marking devices 111, 112, 113, 114 may be provided with suitable temperature control means (not shown), such as cooling means. The temperature control means may suitably control the temperature of the inkjet making devices 111, 112, 113, 114, including the print heads, and the ink inside the inkjet marking devices 111, 112, 113, 114.

FIG. 1 shows that after pre-treatment, the receiving medium P is conveyed to upstream part of the inkjet marking module 11. Then, image formation is carried out by each color ink ejecting from each inkjet marking device 111, 112, 113 and 114 arranged so that the whole width of the image receiving medium P is covered.

Optionally, the image formation may be carried out while the receiving medium is temperature controlled. For this purpose a temperature control device 19 may be arranged to control the temperature of the surface of the transportation mechanism (e.g. belt or drum) underneath the inkjet marking module 11. The temperature control device 19 may be used to control the surface temperature of the receiving medium P, for example in the range of 10° C. to 100° C. The temperature control device 19 may comprise heaters, such as radiation heaters, and a cooling means, for example a cold blast, in order to control the surface temperature of the receiving medium within said range. Subsequently and while printing, the receiving medium P is conveyed to the downstream part of the inkjet marking module 11.

Drying and Fixing

After an image has been formed on the receiving medium, the prints have to be dried and the image has to be fixed onto the receiving medium. Drying comprises the evaporation of solvents, in particular those solvents that have poor absorption characteristics with respect to the selected receiving medium.

FIG. 1 schematically shows a drying and fixing unit 20, which may comprise a heater, for example a radiation heater. After an image has been formed, the print is conveyed to and passed through the drying and fixing unit 20. The print is heated such that solvents present in the printed image, to a large extent water, evaporate. The speed of evaporation and hence drying may be enhanced by increasing the air refresh rate in the drying and fixing unit 20. Simultaneously, film formation of the ink occurs, because the prints are heated to a temperature above the minimum film formation temperature (MFFT). The residence time of the print in the drying and fixing unit 20 and the temperature at which the drying and fixing unit 20 operates are optimized, such that when the print leaves the drying and fixing unit 20 a dry and robust print has been obtained. As described above, the transportation mechanism 12 in the fixing and drying unit 20 may be separated from the transportation mechanism of the pre-treatment and printing section of the printing apparatus and may comprise a belt or a drum.

Post Treatment

To increase the print robustness or other properties of a print, such as gloss level, the print may be post treated, which is an optional step in the printing process. For example, the prints may be post treated by laminating the prints. Alternatively, the post-treatment step comprises a step of applying (e.g. by jetting) a post-treatment liquid onto the surface of the coating layer, onto which the inkjet ink has been applied, so as to form a transparent protective layer on the printed recording medium.

Hitherto, the printing process was described such that the image formation step was performed in-line with the pre-treatment step (e.g. application of an (aqueous) pre-treatment liquid) and a drying and fixing step, all performed by the same apparatus (see FIG. 1). However, the printing process is not restricted to the above-mentioned embodiment. A method in which two or more machines are connected through a belt conveyor, drum conveyor or a roller, and the step of applying a pre-treatment liquid, the (optional) step of drying a coating solution, the step of ejecting an inkjet ink to form an image and the step or drying an fixing the printed image are performed. It is, however, preferable to carry out image formation with the above defined in-line image forming method.

EXPERIMENTS AND EXAMPLES

Materials

Pluronic® F127, Pluronic P103 and Pluronic P105 were obtained from BASF. Xylene, cyanuric chloride, 2-pyrrolidone, 1,2-hexanediol, potassium tert-butoxide and isophoronediisocyanate were obtained from Sigma Aldrich. Dynol 607 is obtained from Air products, BYK 348 is obtained from BYK and Tegowet 240 is obtained from Evonik. As pigment, Pro-Jet Cyan APD pigment was used. This pigment was obtained from Fujifilm as an aqueous dispersion. As water dispersible resin, Neocryl™ A-1127 was used. Neocryl™ A-1127 is an acrylic resin and is obtained from DSM Neoresins as an aqueous emulsion.

All materials were used as obtained, unless stated otherwise.

Methods

Viscosity

The viscosity is measured using a Haake Rheometer, type Haake Rheostress RS 600, with a flat plate geometry. The viscosity is measured at shear rates ($\dot{\gamma}$) of 10 s$^{-1}$.

Single Line Printing

Ink was deposited on a recording medium by jetting the ink using a Dimatix print head (Jet Powered™, Model# DMC-11610/PN 700-10702-01). The print head was operated at 10° C. The recording medium was controlled to be at a temperature of 35° C. The image printed was a straight line. These lines were printed by depositing 0.43 pL μm$^{-1}$ of ink onto the recording medium. After printing, it was judged for each experiment whether line bulging had taken place. Line bulging refers to the phenomenon of local line thickening, for example due to droplet displacement. A consequence of local thickening of a printed line is that the width of the printed line differs locally. In inkjet printing, the occurrence of line bulging is unwanted.

Experiment 1

Production of Pinning Agent (1)

100 gr of Pluronic® F127 was mixed with 50 mL of xylene in a round-bottom flask provided with a Dean-Stark setup. The mixture was refluxed under a nitrogen atmosphere at 180° C.-190° C. for four hours to remove traces of water. The mixture was allowed to cool to 70° C. Subsequently, 25 mL of xylene was removed via the Dean Stark setup. Afterwards, another 25 mL of xylene was added to facilitate stirring. 1.5 grams of isophorone diisocyanate was added to the mixture using a syringe. During the next 30 minutes, the temperature was increased stepwise to 120° C. Afterwards, the mixture was allowed to react for another 4 hours. Subsequently, xylene was removed by evaporation. The resin was transferred into an aluminum dish and dried overnight in an oven at a temperature of 120° C. and a pressure of 1*10$^{-1}$ mbar. The prepared resin 1 is a colorless microcrystalline solid.

Production of Pinning Agent (2)

100 g of Pluronic® F127 was dissolved in 50 mL xylene and dried under nitrogen by the Dean Stark method. After that, 50 mL of dry xylene was added and the resulted mixture was cooled to 70° C. Then 1.68 g of solid KOtBu was added and the mixture was stirred resulting in a slightly opaque solution. 0.92 g of cyanuric chloride was added together with 50 mL extra xylene and the mixture was then stirred overnight. After this, the reaction mixture was diluted with xylene to a volume of 1 L and precipitated at room temperature over the weekend. After filtration, the filtrate was evaporated to dryness with rotary evaporator and further dried in a vacuum oven at 120° C. 39 g of final product was collected. The prepared resin 2 is a white waxy solid.

EXAMPLES

Model Solution A

An aqueous solution of resin 1 was prepared by dissolving 5 grams of resin 1 in 95 grams of water, yielding aqueous model solution A.

Comparative model solution B and Comparative model Solution C were prepared analogously. Comparative model solution B comprises 5 grams of Pluronic P103, instead of resin 1; Comparative model solution C comprises 5 grams of Pluronic P105, instead of resin 1.

Ink Compositions

Several ink compositions were prepared. Ink compositions Ex 1 and Ex 2 comprise resin 1 as a pinning agent, ink composition Ex 3 comprises resin 2 as a pinning agent. Ink compositions Ex1, Ex 2 and Ex 3 are inks according to the present invention, whereas ink compositions CE 1 and CE 2 are not ink compositions according to the present invention.

Production Example Ex 1

Ink composition Ex 1 was prepared by adding 12 gr of 2-pyrrolidone and 1.6 gr of 1,2-hexanediol to water (20 gr) upon stirring at room temperature. Subsequently, 4 gr of resin 1 was added upon stirring. Next, 0.6 gr of Dynol 607 and 0.3 gr of Tegowet 240 was added upon stirring.

Then, 5.2 grams of an 14% aqueous dispersion of Pro-Jet Cyan APD pigment was added upon stirring, as well as an aqueous dispersion of Neocryl™ A-1127. Finally, water was added to until the total weight is 100 gr. The volume and concentrations of the dispersions was selected such that 1.6 gr of pigment and 1.6 gr of Neocryl™ A-1127 was present per 100 gr of ink composition.

The obtained mixture was filtered and subsequently degassed, yielding ink composition Ex 1. Production examples Ex 2 and Ex 3 were prepared analogously.

Comparative production examples CE 1 and CE 2 were prepared analogously to ink composition Ex 1, but no resin 1 or resin 2 was added to the mixture.

TABLE 1

Ink compositions

| Component | Ex 1 | Ex 2 | Ex 3 | CE 1 | CE 2 |
|---|---|---|---|---|---|
| Latex Neocryl A-1127 | 1.6% | 0 | 0 | 0 | 0 |
| Latex AB U9800 latex | 0 | 5.2% | 5.2% | 11% | 5.2% |
| pigment | 1.6% | 2% | 2% | 2% | 2% |
| 2-pyrrolidone | 12% | 15% | 15% | 15.5% | 15% |
| 1,2-hexanediol | 1.6% | 2% | 2% | 2% | 2% |
| Dynol 607 | 0.6% | 0 | 0 | 0.5% | 0 |
| Tegowet 240 | 0.3% | 1% | 1% | 0 | 1% |
| BYK 348 | 0 | 0 | 0 | 0.35% | 0 |
| Resin 1 | 4% | 3.0% | 0 | 0 | 0 |
| Resin 2 | 0 | 0 | 2.2% | 0 | 0 |
| water | remainder | remainder | remainder | remainder | remainder |

Comparison Experiments

Figure 3A:
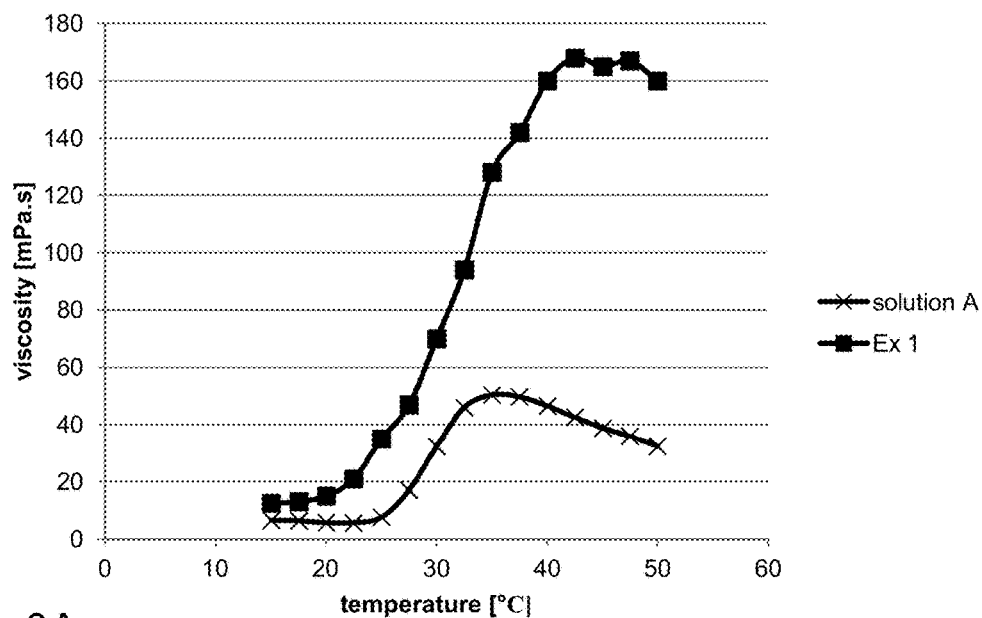
FIG. 3A-3C show the viscosity of a number of solutions as a function of temperature.

The viscosity of solution A and of Ex 1 was measured at several temperatures in between 15° C. and 50° C. The results are shown in FIG. 3A.

At low temperatures, such as temperatures lower than about 20° C., the viscosity of the solutions is low. In FIG. 3A, it is shown that the viscosity of solution A in this temperature range is lower than 10 mPas. When increasing the temperature of the solution to about 40° C., a strong increase in viscosity occurs. Because of this increase in viscosity, the flowability of the ink will decrease when increasing the temperature, such as increasing the temperature from about 25° C. to about 40° C. When the temperature of the solution is increased further, the viscosity of the solution decreases. However, as is shown in FIG. 3A, the viscosity of the solution at 50° C. is still more than three times the viscosity of the solution at about 25° C.

The viscosity of ink composition Ex 1 is lower than 15 mPa·s at temperatures below 20° C. When increasing the temperature, the viscosity of the ink composition Ex 1 strongly increases. For example, at a temperature of 45° C., the viscosity of Ex 1 is 165 mPa·s. Thus, both the viscosity of solution A and ink composition Ex 1 increase with temperature, at least in a certain temperature range. Hence, both solutions show pinning behavior. However, the increase in viscosity of the ink composition Ex 1 is stronger than the increase in viscosity of model solution A. Without wanting to be bound to any theory, this effect is believed to be caused by a synergistic effect between the pinning agent (resin) and the dispersed-resin particles.

Figure 3B:
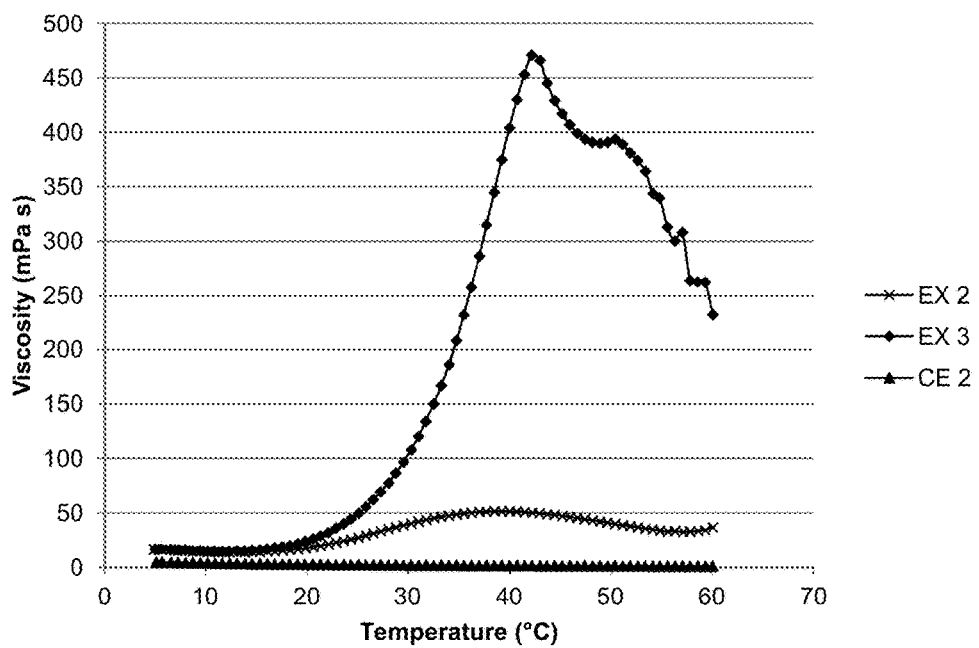

The viscosity of ink compositions Ex 2, Ex 3 and CE 2 was measured at several temperatures in between 5° C. and 55° C. The results are shown in FIG. 3B.

The viscosity of ink composition CE 2 is about 5 mPa s at a temperature of 5° C. When increasing the temperature to 55° C., no viscosity increase is observed. Instead, the viscosity is decreases. Hence, in ink composition CE 2, which does not comprise a pinning agent, no pinning behavior is observed.

The viscosity of ink compositions Ex 2 and Ex 3 is essentially the same at a temperature of 5° C. The viscosity of the two ink compositions does not change much when increasing the temperature from 5° C. to about 15° C. When further increasing the temperature to about 40° C., however, the viscosity of both ink compositions strongly increases. The viscosity of ink composition Ex 2 increases to about 50 mPa s. Hence, when increasing the temperature from 15° C. to 35° C., the viscosity of ink composition Ex 2 increases to about 3.3 times the initial value. When further increasing the temperature to about 55° C., the viscosity decreases. Hence, ink composition Ex 2 comprising resin 1 as a pinning agent, shows pinning behavior.

Ink composition Ex 3 shows an increase in viscosity that is even stronger than the viscosity increase of ink composition Ex 2. When increasing the temperature to about 35° C., the viscosity of ink Ex 3 increases to about 470 mPa s. Hence, when increasing the temperature from 15° C. to 35° C., the viscosity of ink composition Ex 3 increases to about 16.7 times the initial value. When further increasing the temperature to about 55° C., the viscosity decreases. Hence, ink composition Ex 3 comprising resin 2 as a pinning agent, shows pinning behavior.

At lower temperatures, e.g. around 20° C., the ink compositions have a low viscosity and are suitable for being ejected by an inkjet print head.

Figure 3C:
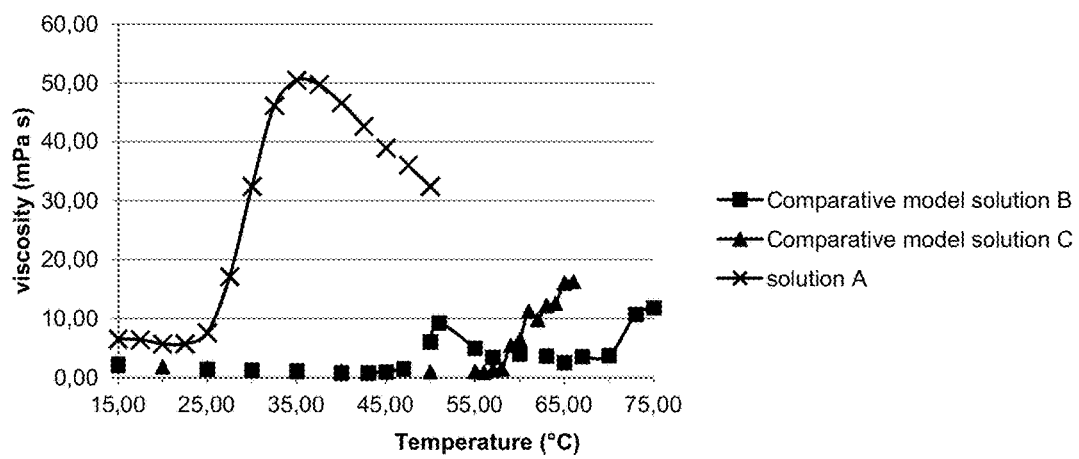

The viscosity of model solution A and comparative model solutions B and C was measured at several temperatures in between 5° C. and 73° C. The results are shown in FIG. 3C.

At low temperatures, such as temperatures lower than about 20° C., the viscosity of the solutions is low. In FIG. 3C, it is shown that the viscosity of solution A in this temperature range is lower than 10 mPas. When increasing the temperature of the solution to about 40° C., a strong increase in viscosity occurs. Because of this increase in viscosity, the flowability of the ink will decrease when increasing the temperature, such as increasing the temperature from about 25° C. to about 40° C. When the temperature of the solution is increased further, the viscosity of the solution decreases. However, as is shown in FIG. 3C, the viscosity of the solution at 50° C. is still more than three times the viscosity of the solution at about 25° C.

In contrast, the viscosity of comparative solutions B and C shows much less increase with increasing temperature. When increasing the temperature to 45° C., no significant viscosity increase is observed for comparative solutions B and C. At a temperature of about 50° C., the viscosity of comparative model solution B slightly increases to about 10 mPas. When further heating the solution, the viscosity of model solution B decreases again and at a temperature of more 73° C., the viscosity increases again to about 11 mPas. The viscosity of comparative model solution C does not show significant increase in viscosity, until a temperature of about 55° C. is reached. At a temperature of about 55° C., the viscosity increases to about 16 mPas.

Hence, the model solution A, comprising a pinning agent in accordance with the present invention shows improved pinning behavior compared to the comparative model solutions B and C. The comparative model solutions B and C comprise polyethylene-polypropylene-polyethylene block copolymers (commercially available as Pluronic). These block copolymers do comprise a polyalkylene unit but do not comprise a linker. Hence, the comparative model solutions B and C do not comprise a pinning agent in accordance with the present invention.

Figure 4A:
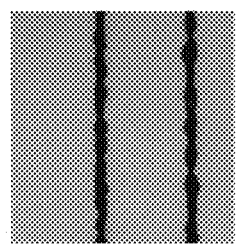
FIG. 4A-4E show a number of prints made using an ink according to the present invention and a number of prints made using ink not according to the present invention.
Figure 4B:
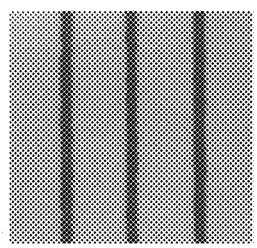
Figure 4C:
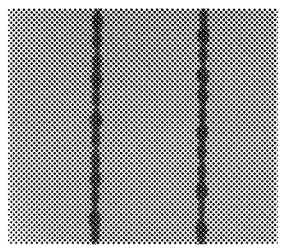
Figure 4D:
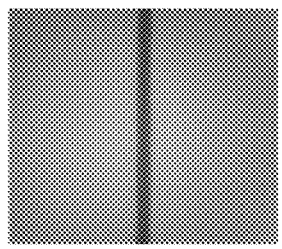
Figure 4E:
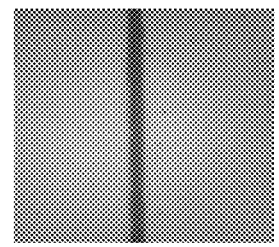

Single line printing experiments were performed on two types of medium; UPM gloss, a machine coated paper and MPI 2000, a vinyl based recording medium. For the UPM gloss medium, single line printing experiments were performed using ink composition Ex 1 and ink composition CE 1. The results are shown in FIG. 4A-4B. For the MPI 200 recording medium, single line printing experiments were performed using ink compositions Ex 1, Ex 3 and CE 1. The results are shown in FIG. 4C-4E.

FIG. 4A shows lines printed using CE 1 on UPM gloss medium. FIG. 4C shows two lines made with the same ink composition on vinyl. In both cases the lines are not perfectly straight. Instead, the lines are locally thickened and the width of the lines is not uniform. Hence, line bulging has taken place. Line bulging can be observed by the human eye and decreases the print quality. Hence, line bulging is an unwanted print artifact. FIG. 4B shows two straight lines that are printed on UPM gloss medium using an ink according to the present invention (Ex 1). In FIG. 4B, no line bulging is observed. FIG. 4D shows two lines printed with ink composition Ex 1; FIG. 4E shows one line printed with ink composition Ex 3. In FIGS. 4D and 4E, the lines were printed onto vinyl. In FIGS. 4D and 4E, like in FIG. 4B, no line bulging is observed. In FIG. 4C, like in FIG. 4A, line bulging is observed.

Hence, no line bulging takes place in prints made using Ex 1 and Ex 3, which are inks according to the present invention. In prints made using CE 1, which is an ink composition not in accordance with the present invention, line bulging is observed. Hence, it is shown that the inks according to the present invention Ex 1 and Ex 3. provide improved print quality, at least with regard to line bulging, which is an example of a phenomenon based on coalescence, compared to CE 1, which is an ink not according to the present invention.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

The invention claimed is:

1. An ink composition comprising:
   a) an aqueous vehicle;
   b) a colorant;
   c) a water-dispersed resin; and
   d) a pinning agent, the pinning agent consisting essentially of a product of a coupling reaction between
   at least two polyether units and
   a linker, the linker comprising at least two linking groups,
      wherein a first one of the at least two polyether units comprises an ethylene oxide moiety ($-[CH_2CH_2O]-$) and wherein the second one of said at least two polyether units comprises a $-[R^1O]-$ moiety, wherein $R^1$ is an alkyl group comprising 3-7 carbon atoms, and
      wherein each one of the at least two linking groups is capable of reacting with an endgroup of a polyether unit.

2. Ink composition according to claim 1, wherein the first polyether unit is a polyethyleneoxide unit.

3. Ink composition according to claim 1, wherein the second polyether unit is a polypropyleneoxide unit.

4. Ink composition according to claim 1, wherein the at least two polyether units are polyethyleneoxide/polypropyleneoxide block copolymers.

5. Ink composition according to claim 1, wherein the linker comprises at least three linking groups.

6. Ink composition according to claim 5, wherein the linker is cyanuric chloride.

7. Ink composition according to claim 1, wherein the linking groups are isocyanate groups.

8. Ink composition according to claim 1, wherein the colorant is a dispersed pigment.

9. Method for preparing an ink composition, the method comprising the steps of:
   a) providing water;
   b) providing a pinning agent, the pinning agent consisting essentially of a product of a coupling reaction between
   at least two polyether units and
   a linker, the linker comprising at least two linking groups,
      wherein a first one of the at least two polyether units comprises an ethylene oxide moiety ($-[CH_2CH_2O]-$) and wherein the second one of said at least two polyether units comprises a $-[R^1O]-$ moiety, wherein $R^1$ is an alkyl group comprising 3-7 carbon atoms, and
      wherein each one of the at least two linking groups is capable of reacting with an endgroup of a polyether unit;
   c) providing a colorant;
   d) providing a water-dispersed resin; and
   e) mixing the water, the pinning agent, the water-dispersed resin and the colorant.

10. Method for applying an image onto a recording medium, the method comprising the steps of:
   a. providing an ink composition according to claim 1;
   b. keeping the ink composition at a temperature T1, T1 being a temperature below a pinning temperature; and
   c. jetting droplets of the ink composition onto a recording medium, the recording medium having a temperature T2, T2 being a temperature above the pinning temperature.

* * * * *